United States Patent
Takano et al.

(10) Patent No.: US 6,775,439 B2
(45) Date of Patent: Aug. 10, 2004

(54) OPTICAL CIRCUIT DEVICE AND OPTICAL TRANSCEIVER

(75) Inventors: Hideaki Takano, Kokubunji (JP); Masahiko Kobayashi, Hitachi (JP)

(73) Assignees: Hitachi, Ltd., Tokyo (JP); Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/183,529

(22) Filed: Jun. 28, 2002

(65) Prior Publication Data

US 2003/0095744 A1 May 22, 2003

(30) Foreign Application Priority Data

Nov. 20, 2001  (JP) ........................................ 2001-354538

(51) Int. Cl.[7] ................................................ G02B 6/26
(52) U.S. Cl. ........................ 385/47; 385/46; 385/129; 385/132
(58) Field of Search .............................. 385/24, 38, 42, 385/43, 46, 47, 49, 129, 130, 131, 132

(56) References Cited

U.S. PATENT DOCUMENTS

| 5,214,725 A | * | 5/1993 | Yanagawa et al. ............. 385/45 |
| 5,528,720 A | * | 6/1996 | Winston et al. ............. 385/146 |
| 5,808,763 A | * | 9/1998 | Duck et al. .................. 359/127 |
| 5,894,535 A | * | 4/1999 | Lemoff et al. ................. 385/47 |
| 6,167,171 A | * | 12/2000 | Grasis et al. .................. 385/24 |
| 6,198,864 B1 | * | 3/2001 | Lemoff et al. ................. 385/47 |
| 6,201,908 B1 | * | 3/2001 | Grann ......................... 385/24 |
| 6,393,170 B1 | * | 5/2002 | Nakajima et al. ............. 385/14 |

FOREIGN PATENT DOCUMENTS

| JP | 05-203830 | * | 8/1993 | ........... G02B/6/28 |
| JP | 07-049430 | * | 2/1995 | ........... G02B/6/293 |
| JP | 10-048439 | * | 2/1998 | ........... G02B/6/12 |
| JP | 11-183741 | * | 7/1999 | ........... G02B/6/12 |

* cited by examiner

Primary Examiner—Robert H. Kim
Assistant Examiner—Michael H. Caley
(74) Attorney, Agent, or Firm—Antonelli, Terry, Stout & Kraus, LLP

(57) ABSTRACT

An optical circuit device makes lightwaves respectively having different wavelengths fall on a filter at different incident angles, respectively. The optical circuit device includes a filter, a mirror and a planar lightwave circuit provided with grooves holding the filter and the mirror therein, and an optical waveguide. The optical waveguide has a receiving part that guides a lightwave to the filter, a multipath reflection part in which the lightwave is reflected repeatedly, and an emitting part that guides lightwaves transmitted by the filter to an emitting end surface. The lightwave falls on the filter at least at two incident angles. The multipath reflection part is provided with a bend waveguide. The filter and the mirror are disposed substantially parallel to each other.

25 Claims, 10 Drawing Sheets

OPTICAL CIRCUIT DEVICE AND OPTICAL TRANSCEIVER

BACKGROUND OF THE INVENTION

The present invention relates to a wavelength division multiplexing optical communication system (WDM optical communication system) and, more specifically, to an optical circuit device using a filter that transmits a lightwave of a desired specific wavelength and reflects lightwaves of desired wavelengths, an optical multiplexer/demultiplexer and an optical transceiver.

A wavelength division multiplexing system (WDM system) includes a plurality of lasers that emit laser beams of different wavelengths, an optical multiplexer that combines the laser beams emitted by the lasers to produce a composite lightwave and introduces the composite lightwave into an optical fiber, an optical demultiplexer that separates the laser beams of the composite lightwave transmitted by the optical fiber, and a plurality of photodiodes. In the WDM system, the capacity of the optical fiber can be easily increased by increasing the number of wavelengths. Recently, the increase of capacity by the WDM system has been applied to low-cost systems, such as local area networks (LANs) and the miniaturization of optical multiplexers and the reduction of cost of multiplexers have been desired.

A generally known conventional optical multiplexer/demultiplexer using a filter that transmits lightwave of a specific wavelength and reflects lightwaves of other wavelengths is comparatively simple in construction and small and can be manufactured at a low cost.

Most generally known methods use filters respectively having different transmission wavelengths, the number of which is equal to that of wavelengths, and a zigzag optical path to separate lightwaves of different wavelengths sequentially. Those methods are disclosed in U.S. Pat. Nos. 5,894,535, 6,198,864 and 6,201,908, and JP-A No. 183741/1999. Other previously proposed methods make lightwaves of wavelength channels fall on a filter at different incident angles. Such methods are disclosed in, for example, U.S. Pat. No. 5,808,763, and JP-A Nos. 49480/1995, 203830/1993 and 48439/1998. Those methods utilize the characteristic of the filter that shifts transmission wavelengths toward the short wavelength side when incident angle θ on the filter increases. Thus, transmission wavelengths can be changed by using different incident angles θ for wavelength channels. Therefore, those methods needs only one filter and hence needs a system simpler in construction than that needed by the former methods.

SUMMARY OF THE INVENTION

Accordingly, it is an object of the present invention to provide an optical circuit device that can be miniaturized even if a method that uses lightwaves in a wide wavelength range and makes lightwaves transmitted through wavelength channels fall at different incident angles on a filter.

Another object of the present invention is to manufacture an optical circuit device capable of dealing with lightwaves of wavelengths in a wide working wavelength range at a high productivity.

A representative optical circuit device according to the present invention is an optical multiplexer/demultiplexer. An optical demultiplexer to be described below by way of example is capable of operating also as an optical multiplexer by using its receiving side as a reflecting side. According to one aspect of the present invention, an optical circuit device includes a filter that transmits a lightwave of a desired, specific wavelength and reflects those of other wavelengths, a mirror that reflects the lightwave of the specific wavelength, and a planar lightwave circuit. Usually, the planar lightwave circuit is provided with two grooves in which the filter and the mirror can be inserted.

An optical waveguide included in the planar lightwave circuit has a receiving part (first part) that guides a composite lightwave to the filter at a specific angle, a multipath reflection part (second part) that repeats guiding the lightwave reflected by the filter toward the mirror and reflected again by the mirror toward the filter, and an emitting part (third part) that guides the lightwave transmitted by the filter to an end surface. The lightwave falls on the filter of the multipath reflection part at least two incident angles, and the filter is used as an optical demultiplexer having filters the number of which is less than that of wavelengths.

The multipath reflection part is provided with a bend optical waveguide, and the filter and the mirror are disposed substantially parallel to each other. The substantially parallel arrangement of the filter and the mirror is a significant advantage of the present invention. The bend optical waveguide will be described later.

An optical circuit device representing the present invention can be described in terms of an optical path. An optical circuit device according to the present invention includes a filter that transmits lightwaves of wavelengths in a desired wavelength range and reflects lightwaves of wavelengths in another desired wavelength range, a mirror, a first optical path, a second optical path, and a plurality of third optical paths; wherein the filter is disposed opposite to the first optical path, the filter and the mirror are disposed substantially parallel to each other on the opposite side of the second optical path on a side for receiving the reflected lightwave reflected by the filter, the filter and the mirror are capable of reflecting lightwaves from each other through the second optical path, the third optical paths are disposed so as to correspond to the position of an optical path reaching the filter of the first optical path, and the position of an optical path reaching the filter of the second optical path interposed between the filter and the mirror, the second optical path is formed by a bend optical waveguide, and the second optical path has at least two incident angles on the filter.

The optical circuit device of the present invention can be used as an optical demultiplexer or an optical multiplexer depending on its receiving side.

BRIEF DESCRIPTION OF THE DRAWINGS

Above and other objects, features and advantages of the present invention will become more apparent from the following description taken in connection with the accompanying drawings, in which.

DETAILED DESCRIPTION OF THE PREFERRED EMBODIMENTS

Figure 1:
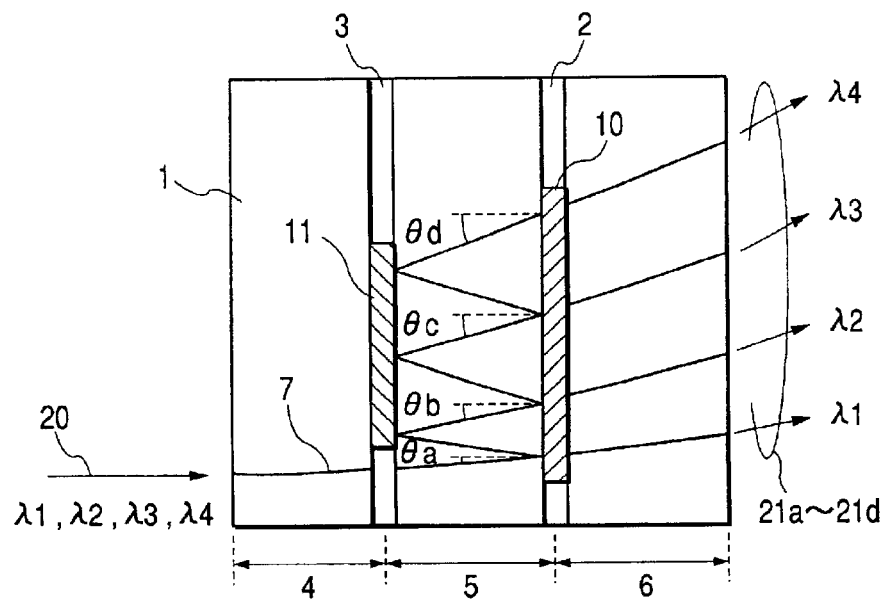
FIG. 1 is a top view of an optical demultiplexer in a preferred embodiment according to the present invention.
Figure 2:
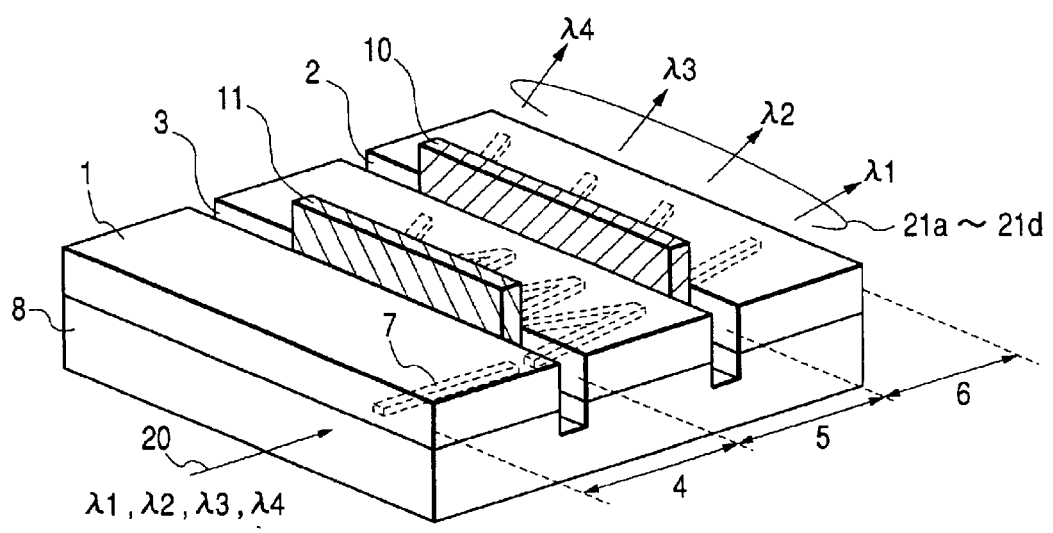
FIG. 2 is a perspective view of the optical demultiplexer shown in FIG. 1.

FIG. 1 is a top view of an optical demultiplexer in a preferred embodiment according to the present invention capable of separating four different wavelengths. An incident lightwave 20 is a composite lightwave produced by combining four lightwaves of wavelengths $\lambda_1$ to $\lambda_4$. The optical demultiplexer includes, as principal components, a planar lightwave circuit (abbreviated to "PLC") 1 provided with grooves 2 and 3, a filter 10 inserted in the groove 2, and a mirror 11 inserted in the groove 3. A waveguide 7 is formed in the PLC 1. The PLC 1, the filter 10 and the mirror 11 may be those prevalently used in this field. For example, the PLC 1 comprises the optical waveguide 7. The optical waveguide 7 may be formed from an inorganic material, such as glass, or an organic material, such as a polymer. As shown in FIG. 2, the waveguide 7 is formed in the PLC 1. In FIG. 2, the core of the optical waveguide 7 is shown. The core is embedded in a cladding. Roughly, the PLC 1 excluding the core 7 is formed of a cladding material. Naturally, the PLC 1 may be of construction other than that shown in FIG. 2.

The optical waveguide 7 has a receiving part 4 for guiding the incident lightwave 20 to the filter 10 at a specific angle, a multipath reflection part 5 that repeats guiding the lightwave reflected by the filter 10 toward the mirror 11 and reflected again by the mirror 11 toward the filter 10, and an emitting part 6 that guides the lightwave transmitted by the filter 10 to an end surface.

A method of fabricating the optical demultiplexer shown in FIG. 1 will be described with reference to FIG. 2. A glass or polymer sheet is laminated to a silicon or glass wafer 8. The receiving part 4, the multipath reflection part 5 and the emitting part 6 are formed in the sheet by known photolithography and a known etching process to complete the PLC 1. Thus, a plurality of optical demultiplexers are formed on the wafer 8. Then, the grooves 2 and 3 are formed with a dicing saw. Then, the wafer 8 is cut with a dicing saw to divide the plurality of optical demultiplexers formed on the wafer 8 into individual optical demultiplexers. Then, the filter 10 and the mirror 11 are inserted in and fixed with an adhesive in the grooves 2 and 3 of each optical demultiplexer, respectively.

Desirably, the respective widths of the grooves 2 and 3, and the respective thicknesses of the filter 10 and the mirror 11 are on the order of 20 $\mu$m to limit excess loss resulting from the division of the optical guide 7 to the least possible extent. A commercially available dicing saw of the foregoing thickness may be used, and the filter 10 may be a commercially available very thin one formed by depositing a functional film on a polyimide substrate. The mirror 11 may be of the same construction as the filter 10 and capable of reflecting all the lightwaves of the wavelengths $\lambda_1$ to $\lambda_4$. The mirror 11 can be readily fabricated by depositing a gold film (Au film) or an aluminum film (Al film) on a polyimide substrate by vapor deposition.

Bend waveguides are formed in the multipath reflection part 5 to make a lightwave fall on the filter 10 sequentially at incident angles $\theta_a$, $\theta_b$, $\theta_c$ and $\theta_d$. The sequential change of the incident angle $\theta$ will be fully understood from FIG. 1. Concretely, a composite lightwave produced by combining four lightwaves respectively having wavelengths $\lambda_1$=1350 nm, $\lambda_2$=1325 nm, $\lambda_3$=1300 nm and $\lambda_4$=1275 nm can be separated into those component lightwaves when the bend waveguides are formed such that $\theta_a$=7.5°, $\theta_b$=14.3°, $\theta_c$=18.7° and $\theta_d$=22.3°.

Figure 3:
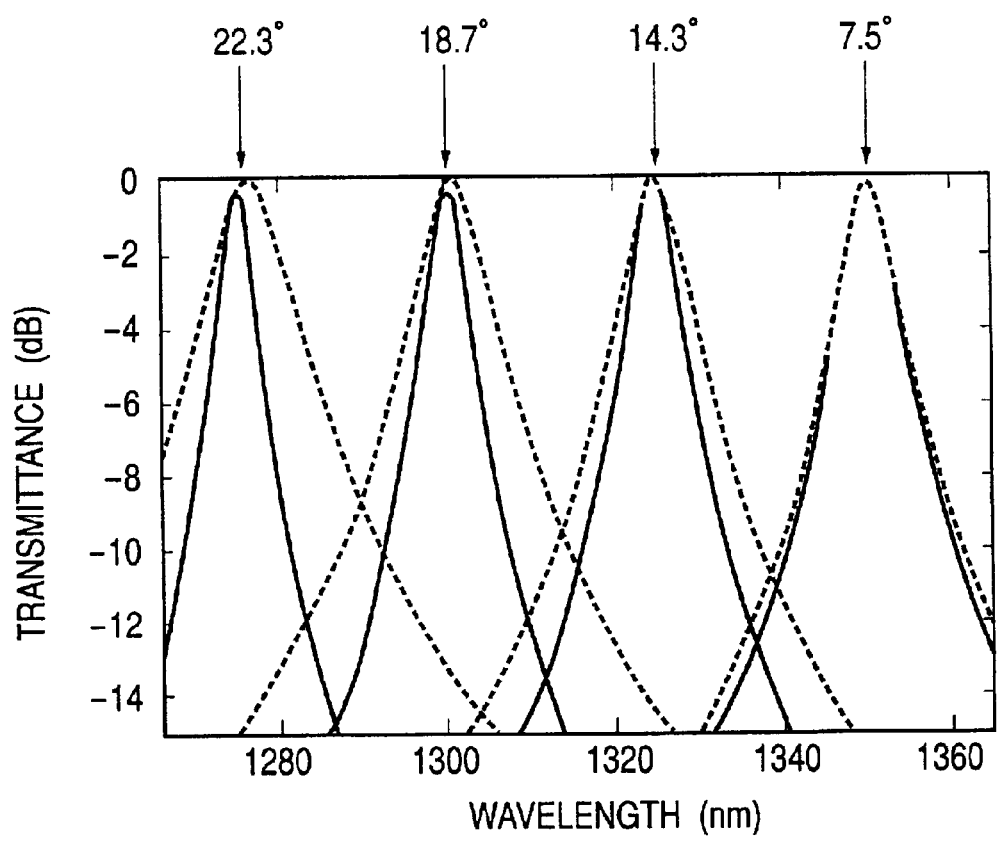
FIG. 3 is a graph showing the transmission characteristic of the optical demultiplexer shown in FIG. 1.

FIG. 3 is a graph showing calculated values representing changes in the transmission characteristic of a filter with the incident angle $\theta$ of the lightwave on the filter. The filter is a dielectric multilayer filter formed by sandwiching a structure HLHLHLHLHLHLLLHLHLHLHLH between glass films (BK7), in which H represents a high-refraction layer of a 147.8 nm thick $TiO_2$ film having a refractive index n=2.3, and L represents a low-refraction layer of a 232.9 nm thick $SiO_2$ having a refractive index n=1.46. In FIG. 3, wavelength is measured on the horizontal axis and transmittance is measured on the vertical axis, angles indicated above the graph are incident angles $\theta$ on the filter, and curves indicates transmission characteristics corresponding to the incident angles $\theta$. In FIG. 3, curves of continuous lines and those of dotted lines represent characteristics for two incident polarized lightwaves, i.e., a p-polarized lightwave parallel to a receiving surface and an s-polarized lightwave perpendicular to the receiving surface. Problems relating with polarized lightwaves will be described later.

It is known from FIG. 3 that a lightwave of 1350 nm in wavelength is transmitted when the incident angle $\theta$=7.5°, and a lightwave of 1325 nm in wavelength is transmitted when the incident angle $\theta$=14.3°. Similarly, a lightwave of 1300 nm in wavelength is transmitted when the incident angle $\theta$=18.7°, and a lightwave of 1275 nm in wavelength is transmitted when the incident angle $\theta$=22.3°. Thus, the transmission wavelength can be shifted toward the short-wavelength side by increasing the incident angle $\theta$.

Only the lightwave of 1350 nm ($\lambda_1$) in wavelength among the component of the incident lightwave 20 is transmitted and the rest, i.e., lightwaves of $\lambda_2$, $\lambda_3$ and $\lambda_4$, are reflected when the incident angle $\theta_a$=7.5°. Then, only the lightwave of 1325 nm ($\lambda_2$) is transmitted and the rest, lightwaves of $\lambda_3$ and $\lambda_4$, are reflected when the incident angle $\theta_b$=14.3°. Similarly, the lightwave of 1300 nm ($\lambda_3$) is transmitted and the rest, i.e., the lightwave of $\lambda_4$, is reflected when the incident angle $\theta_c$=18.7°, and the lightwave of 1275 nm ($\lambda_4$) is transmitted when the incident angle $\theta_d$=22.3°. The lightwaves thus filtered travel through the emitting part 6 to an emitting end surface.

Figure 4:
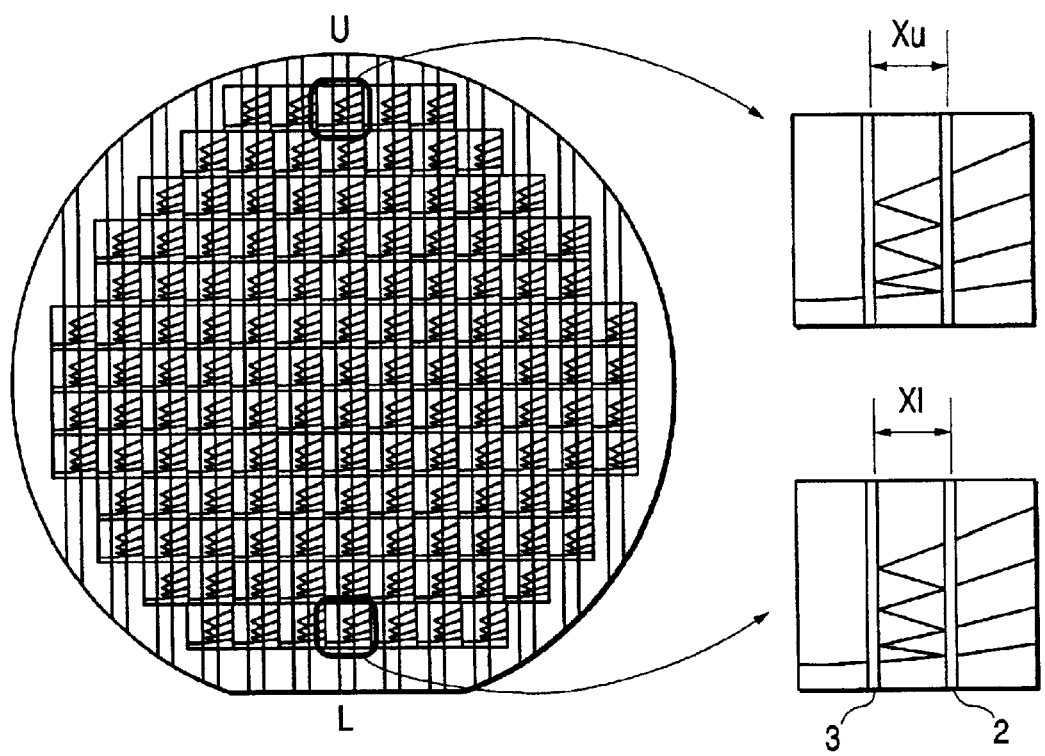
FIG. 4 is a view of assistance in explaining the effect of the optical demultiplexer shown in FIG. 1.

It is a first feature of the present invention that the filter 10 and the mirror 11 are disposed substantially parallel to each other because the incident angle $\theta$ on the filter 10 is determined by the bend waveguide. Formation of the grooves 2 and 3 in the wafer is effective in improving productivity. This effect of the present invention will be described in comparison with the effect of prior art. FIG. 4 shows a 3 in. diameter wafer in a process of forming the grooves 2 and 3. More than hundred optical demultiplexers of the present invention are formed in the 3 in. diameter wafer.

Prior art optical demultiplexer similar to the optical demultiplexer according to the present invention is disclosed in JP-A No. 49430/1995. The prior art optical demultiplexer is provided with a filter 10 and a mirror 11 disposed so as to form an angle α between them. The angle α must be about 2° for a wavelength shift of 75 nm. Grooves 2 and 3 for disposing the filter 10 and the mirror 11 so as to form the angle α between them cannot be formed in the wafer. If the grooves 2 and 3 are formed in the wafer, the physical interval Xu between the grooves 2 and 3 of a chip near the top U of the wafer and the physical interval Xl between the grooves 2 and 3 of a chip near the bottom L of the wafer are different. Therefore, the grooves 2 and 3 must be formed in individual chips obtained by dividing the wafer. Usually, work for forming the grooves 2 and 3 in all the chips obtained by dividing one wafer takes several days.

The grooves 2 and 3 of the optical demultiplexer according to the present invention are extended substantially parallel to each other. Therefore, a chip near the top U of the wafer and a chip near the bottom L of the wafer are the same in the physical interval X between the grooves 2 and 3. Thus, the grooves 2 and 3 can be formed in a wafer before dividing the wafer into individual chips in about one hour, which is effective in improving productivity.

The term "substantially parallel" is used to signify that the grooves 2 and 3 are not mathematically truly parallel. It goes without saying that, practically, errors in shapes are caused by materials and manufacturing processes. In the optical demultiplexer in the preferred embodiment, a desired parallelism between the grooves 2 and 3 is 0.01° or below. If the parallelism between the grooves 2 and 3 is 0.01° or below and the distance between the top U and the bottom L of the wafer is 2 in., the difference ΔX=Xu−Xl, where the Xu is the distance between the grooves 2 and 3 in a chip near the top U, and Xl is the distance between the grooves 2 and 3 in a chip near the bottom L is not greater than an allowable error of 10 μm in the distance X. Although this value is dependent on the parameters of the optical waveguide and the size of the wafer, the value for different conditions can be calculated by the same calculating method.

It is a second feature of the present invention that the bend waveguide is used in a multiple reflection mode. The change in the bend waveguide may be only the difference between the respective incident angles of the lightwaves of the adjacent wavelengths, such as $\Delta\theta=\theta_d-\theta_c$ for changing the incident angle θ greatly. Therefore, despite the use of the bend waveguide, the optical demultiplexer can be formed in a small size. This effect will be described in comparison with that of a prior art optical demultiplexer.

Figure 14:
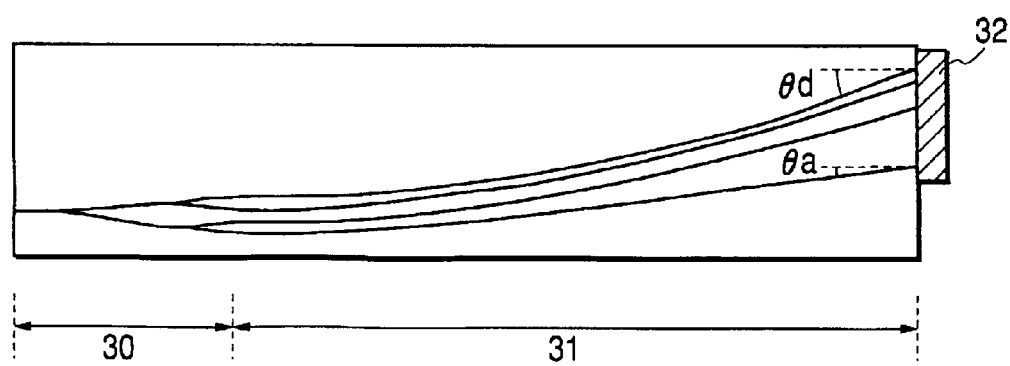
FIG. 14 is a top view of a conventional optical circuit device.

FIG. 14 is a view of assistance in explaining wavelength shift by 75 nm using a prior art bend waveguide. A branching optical wave guide 30 and a bend waveguide 31 are formed continuously to make lightwaves fall on a filter 32 at incident angles $\theta_a$ to $\theta_d$. Generally, a bend waveguide is an optical waveguide that changes the direction of propagation of a lightwave gradually and continuously. The radius of curvature must be 25 m or above to limit radiation loss to 0.1 dB or below when the relative refractive index of the optical waveguide is 0.3%. In this state, the length of the bend waveguide 31 is 10 mm or above to make the incident angle $\theta_d$ equal to 22.3°; that is, the length of the bend waveguide 31 is dependent on the maximum value of incident angle θ, and the wider the wavelength range, the longer is the length of the bend waveguide 31. Since the length of the branching optical waveguide 30 is in the range of about 10 to about 20 mm (dimensions are not proportional in FIG. 14), the optical demultiplexer is inevitably large and the length of the optical demultiplexer is as great as 30 mm. According to the present invention, a bend optical waveguide having a plurality of curvatures along an optical waveguide may be employed. It is essential that a second optical path has at least two incident angles on the filter. The bend optical waveguide is very useful for this purpose.

On the other hand, since the present invention uses the bend waveguide in a multiple reflection mode, the bend waveguide needs to be bent only the difference between the respective incident angles of the lightwaves of the adjacent wavelengths, such as $\Delta\theta=\theta_d-\theta_c$. Therefore, the incident angle difference $\Delta\theta=\theta_d-\theta c=3.6°$ and the bend waveguide can be formed in a length of 1.5 mm even when $\theta_d=22.3°$, so that the optical demultiplexer of the present invention can be miniaturized.

The optical demultiplexer shown in FIG. 1 was fabricated by using PLC glass forming an optical waveguide having a relative refractive index of 0.3%. Although the radius of curvature was 25 mm, the size of the optical demultiplexer was 5 mm. An insertion loss caused by the optical demultiplexer for the lightwave of $\lambda_1$, i.e. the lightwave that travels the shortest optical path, was about 1 dB, and an insertion loss caused by the same for the lightwave of $\lambda_4$, i.e., the lightwave that travels the longest optical path, was about 3 dB. The loss includes an optical fiber coupling loss of 0.1 dB/end surface, a transmission loss caused by the groove 3 was 0.1 dB, a transmission loss caused by the filter was 0.5 dB, a reflection loss caused by reflection by the filter and the mirror was 0.3 dB/point, and a waveguide loss was 0.1 dB/cm.

The effect of the second feature of the present invention on the miniaturization of the device is effective also in increasing the number of optical demultiplexers to be fabricated by using one wafer. Thus, the effect of the second feature, as well as that of the first feature, further improves productivity. It will be understood from the foregoing description that the present invention is capable of coping with both high productivity and miniaturization.

When incident lightwaves are made to fall on the emitting end of the foregoing optical demultiplexer, the optical demultiplexer functions as an optical multiplexer.

Although the foregoing optical waveguide is a single-mode waveguide, the present invention exercises the same effect with a multimode waveguide.

Figure 5:
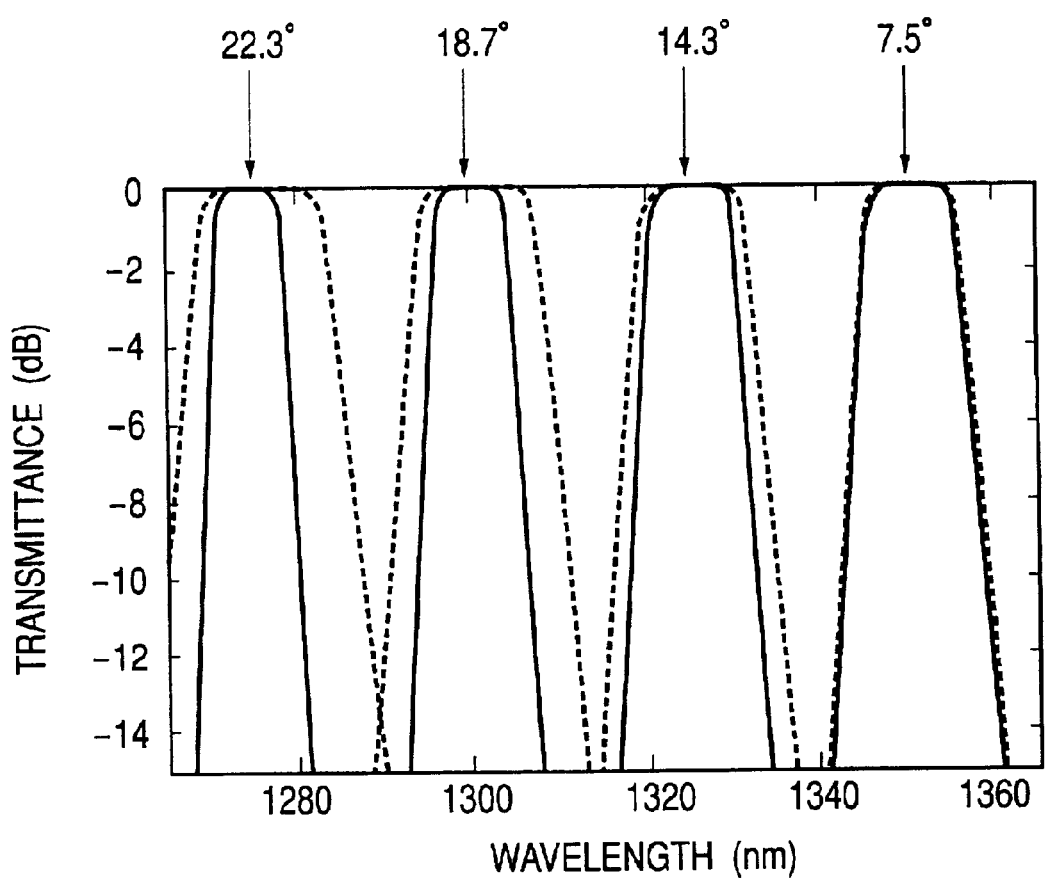
FIG. 5 is a graph showing the transmission characteristic of an optical circuit device in a preferred embodiment according to the present invention.

An optical demultiplexer provided with a filter having a flat top transmission characteristic will be described. The use of a filter having a flat top transmission characteristic as shown in FIG. 5 is effective in reducing the influence of polarization dependence. FIG. 5 shows a transmission characteristic similar to that shown in FIG. 3.

The influence of polarization dependence will be described with reference to FIG. 3. In FIG. 3, curves of continuous lines and those of dotted lines represent characteristics for two incident polarized lightwaves, i.e., a p-polarized lightwave parallel to a receiving surface and an s-polarized lightwave perpendicular to the receiving surface, respectively. The greater the absolute value of incident angle θ, the higher is the polarization dependence of transmission characteristic, which is because the refractive index of each thin film has polarization dependence, and the polarization dependence increases in proportion to the absolute value of incident angle θ. Therefore, when the wavelength range is wide, polarization dependence becomes a significant problem.

For example, when $\theta_d = 22.3°$ and the wavelength of an incident lightwave is 1275 nm, the wavelength separation of the incident lightwave can be stably achieved regardless of the polarization of the incident lightwave. Generally, a WDM system for a low-cost system, such as a LAN, does not use an expensive Peltier device. Consequently, the wavelength of the incident lightwave changes by about 7 nm owing to the temperature dependence (about 0.1 nm/° C.) of a semiconductor laser if the ambient temperature varies in the range of 0 to 70° C. If the wavelength of the incident lightwave becomes 1282 nm, the power of the transmitted lightwave changes as much as 10 dB owing to the polarization of the incident light when $\theta_d = 22.3°$, which causes a trouble in reception.

FIG. 5 is a graph showing calculated flat top transmission characteristics. The filter is a dielectric multilayer filter formed by sandwiching a structure ALALA between glass films (BK7), in which A=HLHLHLHLHLLHLHLHLHLH, H represents a high-refraction layer of a 147.8 nm thick $TiO_2$ film having a refractive index n=2.3, and L represents a low-refraction layer of a 232.9 nm thick $SiO_2$ having a refractive index n=1.46. When a filter of this construction is used, the variation of the wavelength of the incident lightwave in a wavelength range corresponding to the flat tops is permitted and hence the foregoing trouble attributable to polarization can be avoided. The flat top is formed when a 1 dB bandwidth is 7 nm or above with reference to the temperature dependence of the semiconductor laser.

If crosstalk is permissible, a part of the filter 10 corresponding to the last lightwave, i.e., the lightwave that travels the longest optical path, may be omitted, and the last lightwave may be transmitted from the multipath reflection part 5 directly to the emitting part 6, which nullifies the influence of polarization dependence and reduces the transmission loss in the last lightwave.

The filter of the optical multiplexer of the present invention does not need to be a band-pass filter which transmits lightwaves of wavelengths in a predetermined wavelength range around a predetermined wavelength and reflects lightwaves of wavelengths outside the predetermined wavelength range. For example, the filter of the optical demultiplexer shown in FIG. 1 may be an edge filter that reflects lightwaves of wavelengths less than a predetermined wavelength and transmits lightwaves of wavelengths not shorter than the predetermined wavelength.

The PLC 1 of the present invention may be formed of either glass or a polymer. When the PLC 1 is formed of glass, propagation loss is on the order of 0.1 dB, which is negligible.

When the PLC 1 is formed of a polymer, particularly a polymer transparent to lightwaves in the near-infrared region, such as a haloganated polyimide resin produced by replacing some of hydrogen atoms with halogen atoms, such as fluorine atoms, or a PMMA resin (polymethyl methacrylate resin), the propagation loss in the polymer PLC 1 is greater by substantially one digit than that in the glass PLC 1. In particular, the propagation loss of lightwaves in the 1.4 μm band resulting from absorption by C—H bonds is very large and not negligible.

When the PLC 1 is formed of the aforesaid material, propagation loss can be reduced to a negligible extent by selectively determining the pattern of the optical waveguide according to a wavelength region to be used.

Figure 7A:
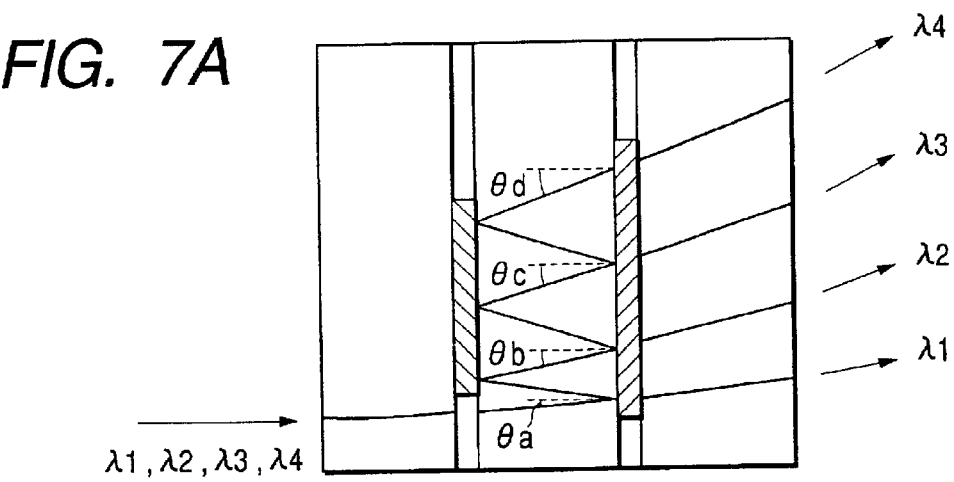
FIGS. 7A, 7B, 7C and 7D are views of assistance in explaining an optical circuit device in a preferred embodiment according to the present invention.
Figure 7B:
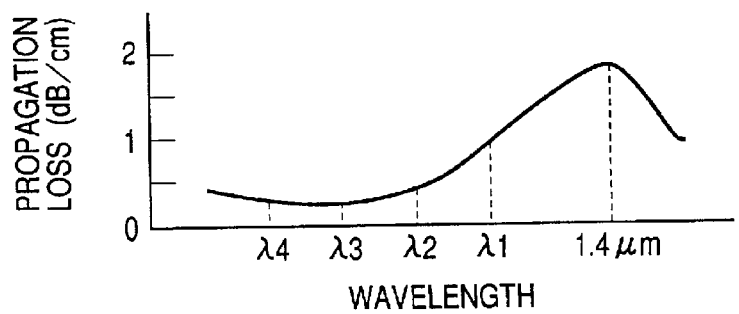
Figure 7C:
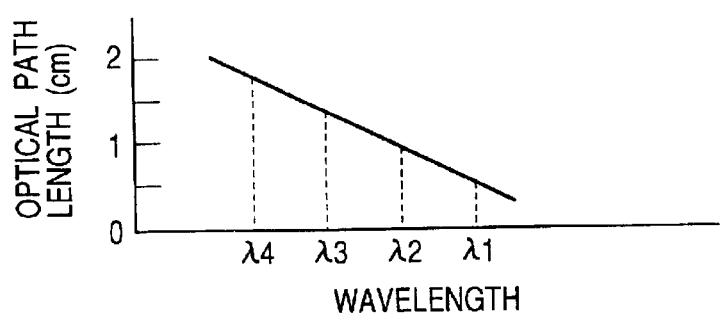
Figure 7D:
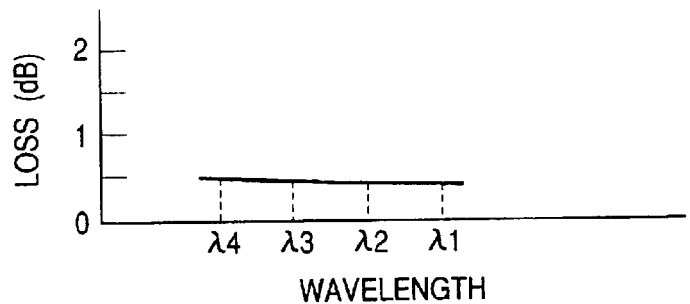
Figure 8A:
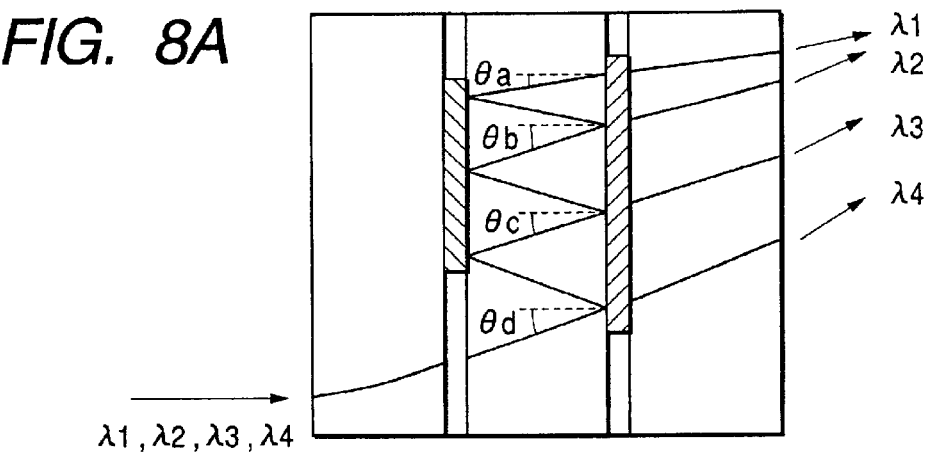
FIGS. 8A, 8B, 8C and 8D are views of assistance in explaining an optical circuit device in a preferred embodiment according to the present invention.
Figure 8B:
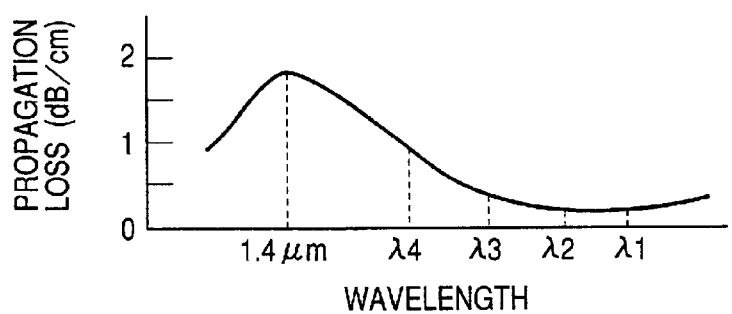
Figure 8C:
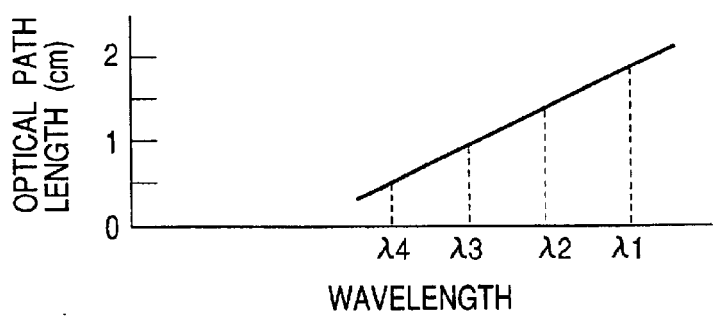
Figure 8D:
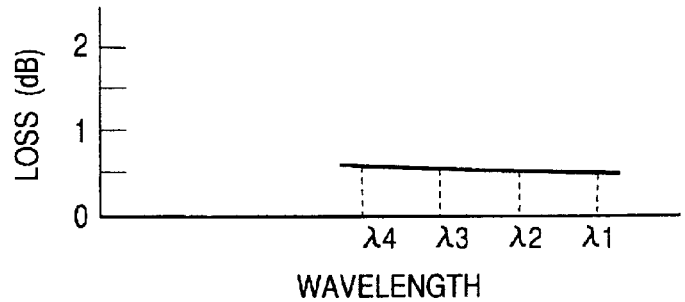

An optical waveguide pattern shown in FIG. 7A is preferable for a 1.3 μm band optical demultiplexer, and an optical waveguide pattern shown in FIG. 8A is preferable for a 1.5 μm band optical demultiplexer. FIGS. 7 and 8 are plan views of waveguide patterns and graphs showing characteristics. FIGS. 7A and 8A are plan views of waveguide patterns, FIGS. 7B and 8B are graphs showing the relation between wavelength and waveguide loss, FIGS. 7C and 8C are graphs showing the relation between wavelength and waveguide length, and FIGS. 7D and 8D are graphs showing the relation between wavelength and propagation loss.

FIG. 7A shows an optical demultiplexer for separating four lightwaves respectively having wavelengths of 1275 nm ($\lambda_4$), 1300 nm ($\lambda_3$), 1325 nm ($\lambda_2$) and 1350 nm ($\lambda_1$) of an incident lightwave. As shown in FIG. 7B, propagation losses in the lightwaves having the wavelengths $\lambda_4$, $\lambda_3$, $\lambda_2$ and $\lambda_1$ are 0.3 dB/cm, 0.3 dB/cm, 0.5 dB/cm and 1 dB/cm, respectively. It is a feature of an optical waveguide pattern shown in FIG. 7A that an optical path length for a wavelength channel having the largest propagation loss, i.e., a wavelength channel the nearest to 1.4 μm, is the shortest. As shown in FIG. 7C, optical path lengths for the lightwaves having the wavelengths $\lambda_1$, $\lambda_2$, $\lambda_3$ and $\lambda_4$ are 0.5 cm, 0.9 cm, 1.3 cm and 1.8 cm, respectively. Thus, as shown in FIG. 7D propagation losses in all the lightwaves can be reduced to about 0.5 dB regardless of wavelength.

Similarly, FIG. 8A shows an optical demultiplexer for separating four lightwaves respectively having wavelengths of 1475 nm ($\lambda_4$), 1500 nm ($\lambda_3$), 1525 nm ($\lambda_2$) and 1550 nm ($\lambda_1$) of an incident lightwave. As shown in FIG. 8B, propagation losses in the lightwaves having the wavelengths $\lambda_4$, $\lambda_3$, $\lambda_2$ and $\lambda_1$ are 1 dB/cm, 0.5 dB/cm, 0.3 dB/cm and 0.3 dB/cm, respectively. It is a feature of an optical waveguide pattern shown in FIG. 8A that an optical path length for wavelength channels having the large propagation losses, i.e., wavelength channels nearer to 1.4 μm, are shorter. As shown in FIG. 8C, optical path lengths for the lightwaves having the wavelengths $\lambda_1$, $\lambda_2$, $\lambda_3$ and $\lambda_4$ are 2 cm, 1.6 cm, 1.2 cm and 0.7 cm, respectively. Thus, as shown in FIG. 8D, propagation losses in all the lightwaves can be reduced to about 0.6 dB regardless of wavelength.

Another example of an optical demultiplexer has a bend waveguide. The present invention uses a bend waveguide in an emitting part 6 to make the directions of emitted lightwaves 21a to 21d parallel and to make physical intervals between the emitted lightwaves 21a to 21d equal.

Figure 9:
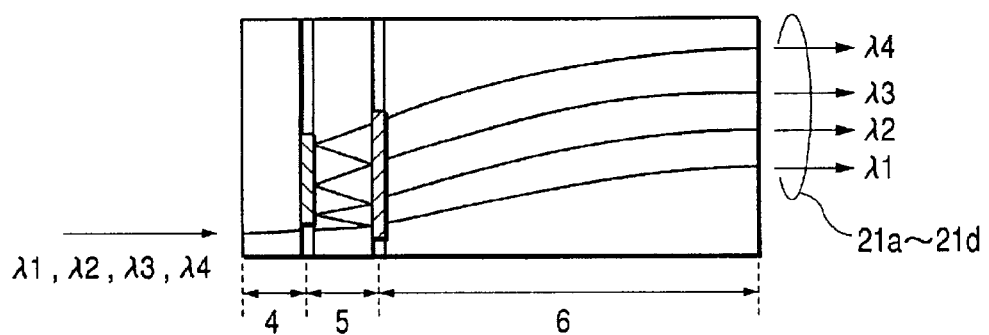
FIG. 9 is a top view of an optical circuit device in a preferred embodiment according to the present invention.

FIG. 9 shows an optical demultiplexer in a preferred embodiment according to the present invention. As shown in FIG. 9, directions of emitted lightwaves 21a to 21d are perpendicular to an end surface of the optical demultiplexer and the emitted lightwaves 21a to 21d are spaced at equal intervals of 1 mm. An optical waveguide has a relative index difference of 0.3% and a radius of curvature of 25 mm. The optical demultiplexer is 6 mm×13 mm in size.

Since the emitted lightwaves 21a to 21d are perpendicular to the end surface and are spaced at equal intervals, the optical demultiplexer can be aligned with a laser array, a photodiode array or an optical fiber ribbon by a single aligning operation, which reduces assembling time. This constitution is particularly effective because the emitted lightwaves 21a to 21b are scattered when incident angle θ is changed greatly. In FIG. 9, parts like or corresponding to those shown in FIG. 1 are denoted by the same reference characters.

Figure 10:
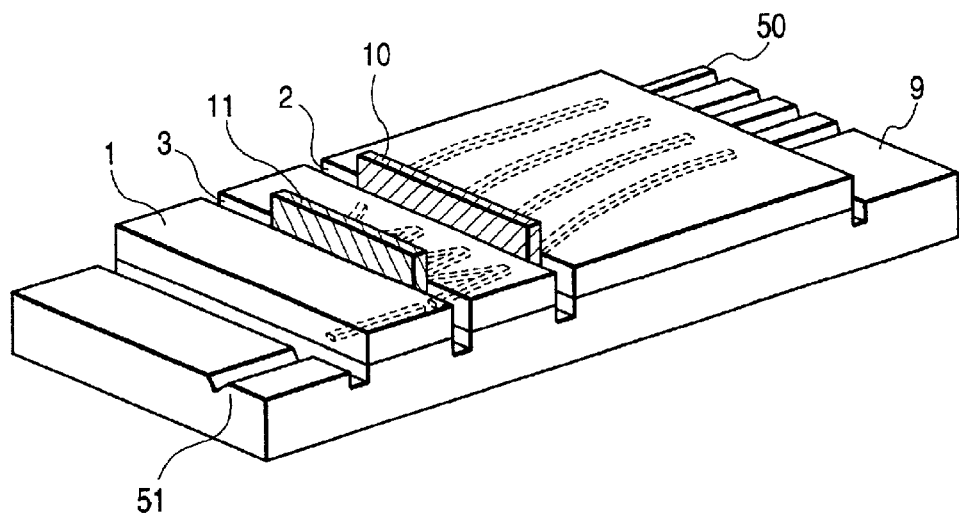
FIG. 10 is a perspective view of an optical circuit device in a preferred embodiment according to the present invention.

This optical demultiplexer can be used in combination with a V-grooved PLC 9 and hybrid-packaging techniques. FIG. 10 shows an optical demultiplexer in a preferred embodiment according to the present invention employing a V-grooved PLC by way of example. An input optical fiber and output optical fiber ribbon can be placed in passive alignment in V-grooves and hence assembling time can be reduced. In FIG. 10, indicated at 50 are V-grooves for holding the optical fiber ribbon therein, at 51 is a V-groove for holding the input optical fiber therein, and parts like or corresponding to those shown in FIG. 1 are denoted by the same reference characters.

The optical demultiplexer shown in FIG. 10 can be packaged together with semiconductor devices to build a small WDM transmitter module or a WDM receiver module.

The length of the bend waveguide on the emission side is dependent on the absolute value of incident angle θ. A longer bend waveguide is necessary for larger incident angle θ to emit lightwaves in a direction perpendicular to the emitting end surface of the optical demultiplexer.

Figure 11:
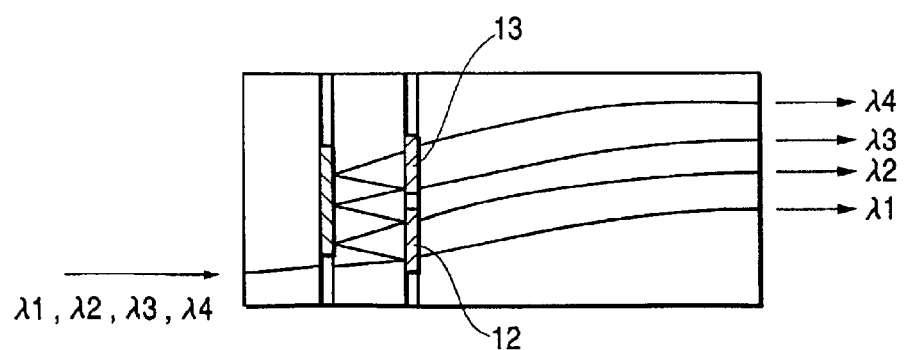
FIG. 11 is a top view of an optical circuit device in a preferred embodiment according to the present invention.

An optical demultiplexer shown in FIG. 11 is provided with a plurality of filters, the number of which is smaller than that of the component lightwaves of an incident lightwave. More concretely, the optical demultiplexer is provided with filters 12 and 13 for transmitting four lightwaves. The filter 12 transmits only a lightwave of 1350 nm ($\lambda_1$) falling thereon at an incident angle $\theta_a=7.5°$ and a lightwave of 1325 nm ($\lambda_2$) falling thereon at an incident angle $\theta_b=14.3°$. The filter 13 transmits only a lightwave of 1300 nm ($\lambda_3$) falling thereon at an incident angle $\theta_a=7.7°$ and a lightwave of 1275 nm ($\lambda_4$) falling thereon at an incident angle $\theta_b=14.3°$. When the optical demultiplexer is thus provided with the two filters 12 and 13, the frequency range to be dealt with by each of the filters 12 and 13 can be narrowed, the maximum incident angle θ=22.3° for the optical demultiplexer shown in FIG. 9 can be reduced to 14.5°, and the optical demultiplexer can be formed in a small size of 4 mm×10 mm.

Figure 6:
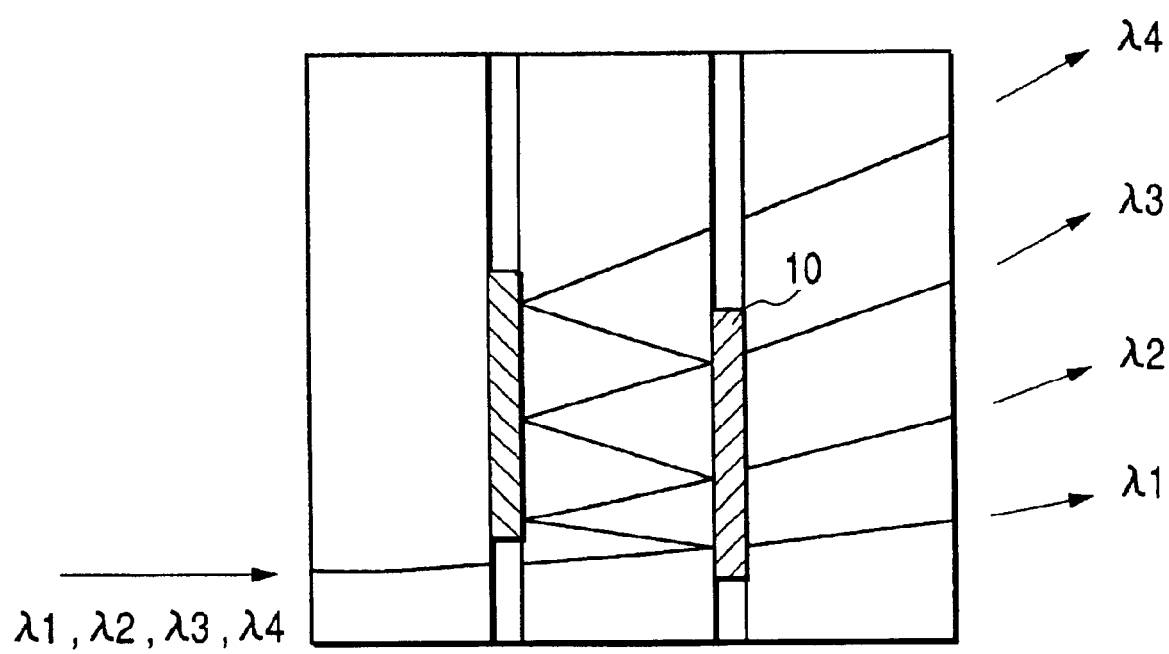
FIG. 6 is a top view of an optical circuit device in a preferred embodiment according to the present invention.

The filter 12 is the same in construction as that shown in FIG. 6. The filter 13 is a dielectric multilayer filter formed by sandwiching a structure ALALAA between glass films (BK7), in which A=HLHLHLHLHLLHLHLHLHLH, H represents a high-refraction layer of a 142.4 nm thick $TiO_2$ film having a refractive index n=2.3, and L represents a low-refraction layer of a 224.3 nm thick $SiO_2$ having a refractive index n=1.46.

Figure 12:
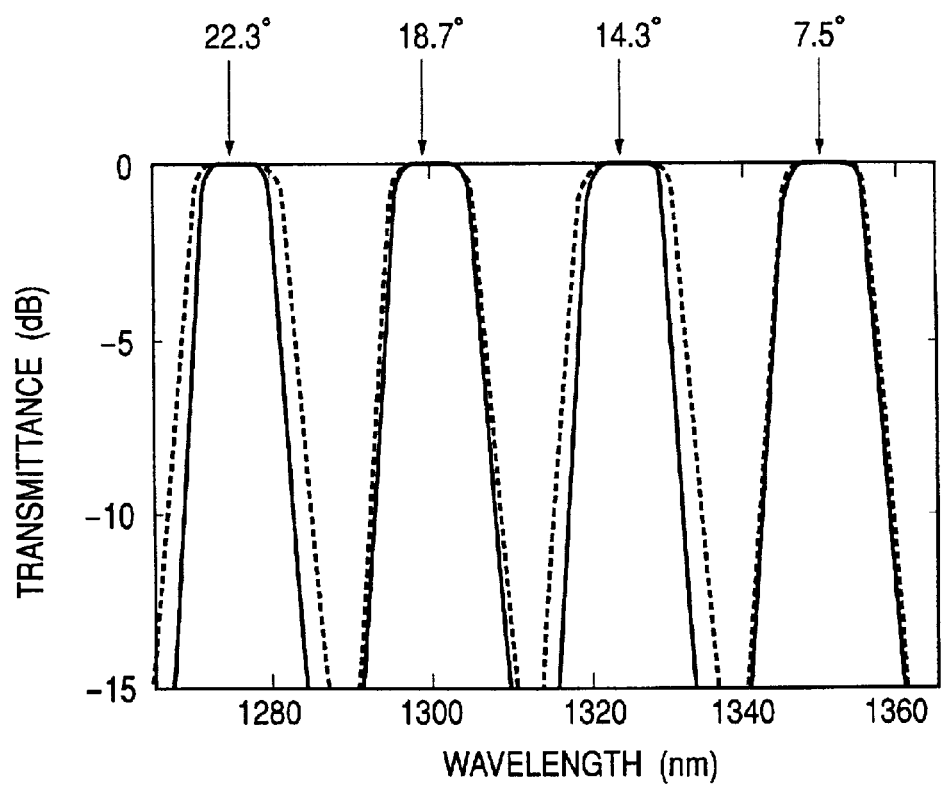
FIG. 12 is a graph showing the transmission characteristic of the optical circuit device shown in FIG. 11.

FIG. 12 is a graph showing calculated transmission characteristics of the filters 12 and 13. Since each of the filters 12 and 13 needs to cover a narrow wavelength range, the optical demultiplexer is effective in miniaturization and in reducing the influence of polarization dependence.

Although the invention has been described as applied to separating four lightwaves respectively having different wavelengths, the present invention is applicable to separating more than four lightwaves respectively having different wavelengths. When an optical demultiplexer is intended for separating eight lightwaves respectively having different wavelengths, a waveguide is formed in a PLC in a pattern for guiding eight lightwaves. Such an optical demultiplexer can be easily assembled and needs only one filter. An optical demultiplexer provided with two filters has effect in miniaturization and in reducing the influence of polarization dependence.

Figure 13:
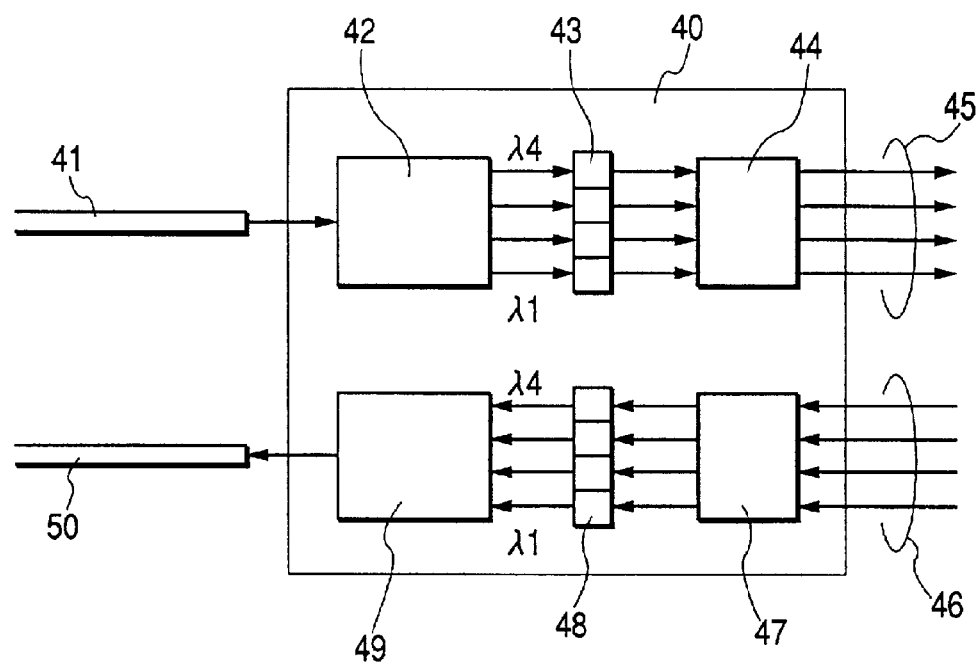
FIG. 13 is a top view of an optical circuit device in a preferred embodiment according to the present invention.

An optical demultiplexer according to the present invention can be incorporated into a small optical transceiver for a LAN. FIG. 13 shows an optical transceiver 40 by way of example. An input optical fiber 41 and an output optical fiber 50 are connected optically to the optical transceiver 40. An input composite optical signal is given to an optical demultiplexer 42. The optical demultiplexer separates the component optical signals respectively having wavelengths $\lambda_1$, $\lambda_2$, $\lambda_3$ and $\lambda_4$ of the input composite optical signal. Photodiodes 43 converts the component optical signals of $\lambda_1$, $\lambda_2$, $\lambda_3$ and $\lambda_4$ into corresponding electric signals. An amplifier 44 amplifies the electric signals provided by the photodiodes 43 and provides amplified output electric signals 45. A laser driver 47 receives input electric signals 46. The laser driver 47 distributes the input electric signals 46 to a laser array 48 including lasers. The lasers of the laser array 48 emit laser beams respectively having wavelengths $\lambda_1$, $\lambda_2$, $\lambda_3$ and $\lambda_4$. An optical multiplexer 49 receives the laser beams, combines the laser beams to produce a composite optical signal, and gives the composite optical signal to the output optical fiber 50.

The present invention is applicable to the optical demultiplexer 42 and the optical multiplexer 49. A method applied to such an optical transceiver separates the component lightwaves of a composite lightwave by using a number of filters corresponding to the number of wavelengths, and a zigzag optical path. Methods similar to such a method are disclosed in U.S. Pat. Nos. 5,894,535, 6,198,864 and 6,201,908, and JP-A No. 183741/1999. The number of component parts needed by the present invention is smaller than that needed by the prior art. Therefore, an optical multiplexer/demultiplexer according to the present invention can be manufactured at a low cost, and hence an optical transceiver employing the optical multiplexer and the optical demultiplexer of the present invention can be manufactured at a low cost.

The present invention will be examined in comparison with conventional techniques. A conventional method that makes lightwaves respectively having different wavelengths fall on a filter at different incident angles is difficult to apply to a low-cost WDM system, such as a LAN because such a low-cost WDM system must be capable of dealing with lightwaves having wavelengths in a wide wavelength range, such as a range of 10 to 100 nm, and hence must be capable of very large wavelength shift. Therefore, incident angle θ must be changed greatly, and the device is inevitably large and cannot be fabricated at a high productivity at a low cost. Since the conventional technique has been used to deal with lightwaves having wavelengths in a narrow wavelength range (≦10 nm), such a difficulty has not been practically realized.

For example, a device disclosed in U.S. Pat. No. 5,808,763 changes the angular position of a reflecting surface by a bulk optical system. This device needs a complicated optical path to change incident angle θ, precision optical parts, precision assembling work for assembling precision optical parts, and long assembling time.

JP-A Nos. 49430/1995, 203830/1993 and 48439/1998 propose devices each including a PLC provided with grooves, and a filter and a mirror inserted in the grooves of the PLC. The device disclosed in JP-A No. 49430/1995 includes a filter 1, and a mirror 2 disposed at an angle α to the filter 1 to make a lightwave to be reflected for multiple reflections so that the incident angle θ of the lightwave on the filter changes every time the lightwave is reflected. However, incident angle θ must be exclusively a multiple of the angle α ($\theta_2=\theta_1+2\alpha$). Consequently, lightwaves respectively having wavelengths of equal wavelength intervals cannot be separated. That is, this device is not applicable to the WDM system in which lightwaves respectively have wavelengths of equal wavelength intervals.

JP-A No. 203830/1993 proposes a device including a curved filter to change incident angle θ. The filter must be accurately and greatly curved to change incident angle θ greatly, which impose difficulties on assembling work and characteristics reproduction.

JP-A No. 48439/1998 proposes a device provided with a branching optical waveguide 24 for separating the component lightwaves of an incident composite lightwave, and a bend waveguide connected to the branching optical waveguide to change incident angle θ. The bend waveguide must be gently bent to change incident angle θ greatly. Therefore, the device is inevitably large. The number of such large devices that can be simultaneously formed on a single wafer is small and hence such a device cannot be manufactured at a low cost.

As apparent from the foregoing description, according to the present invention, lightwaves having different wavelengths in a wide working wavelength range can be made to fall on the filter at different incident angles, respectively, and the optical multiplexer/demultiplexer can be formed in a small size and can be manufactured at a high productivity.

Thus, the present invention provides a small optical circuit device capable of combining or separating lightwaves and of being manufactured at a high productivity.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

The reference characters used in the above description will be briefly explained below.

1: planar lightwave circuit, 2: groove, 3: groove, 4: receiving part, 5: multipath reflection part, 6: emitting part, 7: optical waveguide, 8: wafer, 9: V-grooved planar lightwave circuit, 10: filter, 11: mirror, 20: incident lightwave, 21a: emitted lightwave, 21b: emitted lightwave, 21c: emitted lightwave, 21d: emitted lightwave, 30: branching optical waveguide, 31: bend waveguide, 32: filter, 40: optical transceiver for a LAN, 41: input optical fiber, 42: optical demultiplexer, 43: photodiode array, 44: amplifier, 45: output electric signal, 46: input electric signal, 47: laser driver, 48: laser array, 49: optical multiplexer, 50: output optical fiber.

What is claimed is:

1. An optical circuit device comprising:
    a filter that transmits lightwaves having wavelengths in a desired wavelength range and reflects lightwaves having wavelengths in another desired wavelength range;
    a mirror capable of reflecting lightwaves reflected by the filter and disposed substantially parallel to the filter;
    a second optical path having a plurality of curved optical waveguides extending between the filter and the mirror to enable mutual reflection between the filter and the mirror through the curved optical waveguides, each of the curved optical waveguides, which is extended from a light-receiving side of the mirror to a light-receiving side of the filter, being an optical waveguide that changes the direction of propagation of a lightwave gradually and continuously;
    a first optical path optically connected to a predetermined end of the curved optical waveguide of the second optical path to serve as an input/output end; and
    third optical paths formed at positions opposite to a side of the second optical path with respect to the filter so as to correspond to predetermined positions included in a group including positions where the curved optical waveguides of the second optical path optically connected to the first optical path are joined to the filter, and positions where the curved optical waveguides of the second optical path extending between the filter and the mirror are joined to the filter, and so as to make emitted lightwaves from the third optical paths having equal wavelength intervals,
    wherein the curved optical waveguides of the second optical path have at least two incident angles on the filter.

2. The optical circuit device according to claim 1, wherein the incident angles of the curved optical waveguides of the second optical path on the filter are determined such that component lightwaves respectively having different wavelengths of an incident composite lightwave applied to the first optical path are separated selectively upon the arrival of the composite lightwave at the third optical path, and wherein the positions of the arrival of the composite lightwave are spaced at equal physical intervals.

3. The optical circuit device according to claim 1, wherein the filter has a flat-top transmission characteristic.

4. The optical circuit device according to claim 1, wherein the second optical path and the third optical path for a wavelength channel that travels the longest optical path are directly optically coupled, skipping the filter.

5. The optical circuit device according to claim 1, wherein a curved optical waveguide is included in the third optical path which corresponds to an optical waveguide that changes the direction of propagation of a lightwave gradually and continuously.

6. The optical circuit device according to claim 1, further comprising one or more filters arranged substantially in parallel with the mirror to transmit the lightwaves, and the number of the filters is not less than two, the number of component lightwaves of the composite lightwave is not less than three.

7. The optical circuit device according to claim 1, wherein the third optical paths are used as input ends so as to use the optical circuit device as an optical multiplexer.

8. The optical circuit device according to claim 1, wherein each of the curved optical waveguides, which is extended from a light-receiving side of the filter to a light-receiving side of the mirror, corresponds to an optical waveguide that changes the direction of propagation of a lightwave gradually and continuously.

9. An optical circuit device comprising:
    a filter having a reflection characteristic to transmit lightwaves having wavelengths in a desired wavelength range and to reflect lightwaves having wavelengths in another desired wavelength range;
    a mirror; and
    a planar lightwave circuit provided with an optical waveguide;
    wherein the filter and the mirror are disposed substantially parallel to each other between first and second input/output ends of the planar lightwave circuit,
    the optical waveguide of the planar lightwave circuit has a first part that guides a composite lightwave incident on a first end surface of the optical waveguide coinciding with a first input/output end of the planar lightwave circuit to the filter at a predetermined angle, a second part that repeats guiding the composite lightwave reflected by the filter toward the mirror and the composite lightwave reflected again by the mirror toward the filter, and a third part that guides lightwaves transmitted by the filter to second end surfaces of a plurality of optical waveguides coinciding with a second input/output end of the planar lightwave circuit, and the composite lightwave falls on the filter at least at two incident angles in the second part, and a plurality of curved optical waveguides are formed in the second part, each of the curved optical waveguides, which is extended from a light-receiving side of the mirror to a light-receiving side of the filter, being an optical waveguide that changes the direction of propagation of a lightwave gradually and continuously, so as to make emitted wavelengths from the third part of the optical waveguide having equal wavelength intervals.

10. The optical circuit device according to claim 9, wherein the first optical path is used as an input end so as to use the optical circuit device as an optical demultiplexer.

11. The optical circuit device according to claim 9, wherein the first input/output end is used as an input end so as to use the optical circuit device as an optical demultiplexer.

12. The optical circuit device according to claim 9, wherein the second input/output end is used as an input end so as to use the optical circuit device as an optical multiplexer.

13. The optical circuit device according to claim 9, wherein the incident composite lightwave includes component lightwaves having wavelengths less than 1.4 μm, optical paths for the component lightwaves having longer wavelengths are shorter and optical paths for the component lightwaves having shorter wavelengths are longer, or wherein the incident composite lightwave includes component lightwaves having wavelengths not less than 1.4 μm, optical paths for the component lightwaves having shorter wavelengths are shorter and optical paths for the component lightwaves having longer wavelengths are longer.

14. An optical circuit device comprising:
a filter arranged to transmit lightwaves having wavelengths in a desired wavelength range and reflect lightwaves having wavelengths in another desired wavelength range;
a mirror arranged substantially parallel to the filter, to reflect lightwaves reflected by the filter;
a second optical path having a plurality of curved optical waveguides extending between the filter and the mirror to enable mutual reflection between the filter and the mirror through the curved optical waveguides;
a first optical path optically connected to a predetermined end of the curved optical waveguide of the second optical path to serve as an input/output end; and
third optical paths formed at positions opposite to a side of the second optical path with respect to the filter so as to correspond to predetermined positions included in a group including positions where the curved optical waveguides of the second optical path optically connected to the first optical path are joined to the filter, and positions where the curved optical waveguides of the second optical path extending between the filter and the mirror are joined to the filter, so as to make emitted lightwaves from the third optical paths having equal wavelength intervals
wherein the curved optical waveguides of the second optical path have at least two incident angles on the filter; and
wherein each of the curved optical waveguides of the second optical path, which is extended from a light-receiving side of the mirror to a light-receiving side of the filter, is an optical waveguide that changes the direction of propagation of a lightwave gradually and continuously.

15. The optical circuit device according to claim 14, wherein the planar lightwave circuit is formed from polymer of a halogenated polyimide or a polymethyl methacrylate.

16. An optical transceiver comprising either a first signal system including at least a first optical circuit device and a first photoelectric converter for receiving an optical signal from the first optical circuit device, or a second signal system including at least a second photoelectric converter for converting an electric signal into a corresponding optical signal and a second optical circuit device for receiving an optical signal from the second photoelectric converter,
wherein either the first or the second optical circuit device comprises:
a filter to transmit lightwaves having wavelengths in a desired wavelength range and reflect lightwaves having wavelengths in another desired wavelength range;
a mirror arranged substantially parallel to the filter, to reflect lightwaves reflected by the filter;
a second optical path having a plurality of curved optical waveguides extending between the filter and the mirror to enable mutual reflection between the filter and the mirror through the curved optical waveguides, each of the curved optical waveguides, which is extended from a light-receiving side of the mirror to a light-receiving side of the filter, being an optical waveguide that changes the direction of propagation of a lightwave gradually and continuously;
a first optical path optically connected to a predetermined end of the curved optical waveguide of the second optical path to serve as an input/output end; and
third optical paths formed at positions opposite to a side of the second optical path with respect to the filter so as to correspond to predetermined positions included in a group including positions where the curved optical waveguides of the second optical path optically connected to the first optical path are joined to the filter, and positions where the curved optical waveguides of the second optical path extending between the filter and the mirror are joined to the filter, so as to make emitted lightwaves from the third optical paths have equal wavelength intervals,
wherein the curved optical waveguides of the second optical path have at least two incident angles on the filter.

17. The optical transceiver according to claim 16, wherein each of the curved optical waveguides, which is extended from a light-receiving side of the filter to a light-receiving side of the mirror, corresponds to an optical waveguide that changes the direction of propagation of a lightwave gradually and continuously.

18. The optical transceiver according to claim 16, wherein the incident angles of the curved optical waveguides of the second optical path on the filter are determined such that component lightwaves respectively having different wavelengths of an incident composite lightwave applied to the first optical path are separated selectively upon the arrival of the composite lightwave at the third optical path, and wherein the positions of the arrival of the composite lightwave are spaced at equal physical intervals.

19. The optical transceiver according to claim 16, wherein the filter is an edge filter arranged to reflect lightwaves of wavelengths less than a predetermined wavelength and transmit lightwaves of wavelengths not shorter than the predetermined wavelength.

20. An optical circuit device comprising:

a planar lightwave circuit formed on a substrate, and provided with grooves;

a mirror and a filter arranged in the grooves and substantially parallel to each other between opposite ends of the planar lightwave circuit;

a second optical path having a plurality of curved optical waveguides extending between the filter and the mirror to enable mutual reflection between the filter and the mirror through the curved optical waveguides each of the curved optical waveguides, which is extended from a light-receiving side of the mirror to a light-receiving side of the filter, being an optical waveguide that changes the direction of propagation of a lightwave gradually and continuously;

a first optical path optically connected to a predetermined end of a curved optical waveguide of the second optical path to serve as an input terminal; and plural third optical paths formed at positions opposite to a side of the second optical path with respect to the filter so as to correspond to predetermined positions included in a group including positions where the curved optical waveguides of the second optical path optically connected to the first optical path are joined to the filter, and positions where the curved optical waveguides of the second optical path extending between the filter and the mirror are joined to the filter, so as to make emitted lightwaves from the plural third optical paths having equal wavelength intervals.

21. An optical circuit device comprising:

a planar lightwave circuit formed on a substrate, and provided with first and second substantially parallel grooves;

a mirror arranged in the first groove provided on the planar lightwave circuit;

a filter arranged in the second groove provided on the planar lightwave circuit;

an optical waveguide formed in the planar lightwave circuit to receive an incident lightwave and guide the incident lightwave directly to the filter at an incident angle;

a first plurality of curved optical waveguides formed in the planar lightwave circuit extending between the mirror and the filter, to guide the incident lightwave reflected by the filter toward the mirror and reflected again by the mirror toward the filter, so as to make the lightwave fall on the filter sequentially at different incident angles; and a second plurality of curved optical waveguides formed in the planar lightwave circuit extending from the filter, to guide the lightwaves emitted from the filter to an end surface such that emitted lightwaves from the filter at the end surface are spaced at equal wavelength intervals.

22. An optical circuit device according to claim 21, wherein a length of each of the second plurality of curved optical waveguides is dependent upon an absolute value of the incident angle.

23. An optical circuit device according to claim 21, wherein the filter has a flat top transmission characteristic to reduce the influence of polarization dependence.

24. An optical circuit device according to claim 21, wherein the filter is an edge filter arranged to reflect lightwaves of wavelengths less than a predetermined wavelength and transmit lightwaves of wavelengths not shorter than the predetermined wavelength.

25. An optical circuit device according to claim 21, wherein each of the curved optical waveguides, which is extended from a light-receiving side of the filter to a light-receiving side of the mirror, corresponds to an optical waveguide that changes the direction of propagation of a lightwave gradually and continuously.

* * * * *